(12) United States Patent
Tavener

(10) Patent No.: US 8,267,575 B2
(45) Date of Patent: Sep. 18, 2012

(54) TEMPERATURE MEASURING DEVICE

(75) Inventor: John P. Tavener, Southport (GB)

(73) Assignee: Isothermal Technology Limited, Southport (GB)

( * ) Notice: Subject to any disclaimer, the term of this patent is extended or adjusted under 35 U.S.C. 154(b) by 1004 days.

(21) Appl. No.: 12/208,596

(22) Filed: Sep. 11, 2008

(65) Prior Publication Data
US 2009/0067475 A1 Mar. 12, 2009

(30) Foreign Application Priority Data

Sep. 11, 2007 (GB) .................................. 0717714.0

(51) Int. Cl.
*G01K 15/00* (2006.01)
(52) U.S. Cl. ..................................... 374/1; 374/2; 374/3
(58) Field of Classification Search .................. 374/1, 2, 374/3, 100, 208, 121, 129
See application file for complete search history.

(56) References Cited

U.S. PATENT DOCUMENTS

| 3,216,236 | A | * | 11/1965 | Rohrbach | 374/3 |
| 4,011,552 | A | * | 3/1977 | Quirke | 340/585 |
| 4,523,859 | A | * | 6/1985 | Bonnier et al. | 374/1 |
| 5,219,225 | A | * | 6/1993 | Ball | 374/1 |
| 5,833,366 | A | * | 11/1998 | Ma | 374/26 |
| 6,050,723 | A | | 4/2000 | Amra | 374/140 |
| 6,293,695 | B1 | * | 9/2001 | Schmermund | 374/1 |
| 6,398,405 | B1 | * | 6/2002 | Yamada | 374/1 |
| 6,641,299 | B2 | * | 11/2003 | Sasajima et al. | 374/2 |
| 6,663,277 | B1 | * | 12/2003 | Sandmæl | 374/3 |
| 6,939,035 | B2 | * | 9/2005 | Machin | 374/2 |
| 7,063,457 | B2 | * | 6/2006 | Kang et al. | 374/3 |
| 7,507,019 | B2 | * | 3/2009 | Price | 374/1 |
| 7,677,794 | B2 | * | 3/2010 | Kim et al. | 374/1 |
| 7,837,382 | B2 | * | 11/2010 | Yamada | 374/1 |
| 2005/0053114 | A1 | | 3/2005 | Kang et al. | |

FOREIGN PATENT DOCUMENTS

| EP | 1 008 839 B1 | 8/2007 |
| GB | 2 446 087 A | 7/2008 |
| JP | 61-209346 A | 9/1986 |
| WO | WO 2007/043244 A1 | 4/2007 |

OTHER PUBLICATIONS

H. Preston Thomas, The International Temperature Scale of 1990 (ITS-90), Metrologia 27, 3-10 (1990), Springer-Verlag 1990.
British Examination Report mailed Jan. 5, 2009 in corresponding British Patent Application No. GB0816613.4.

\* cited by examiner

*Primary Examiner* — Peter Macchiarolo
*Assistant Examiner* — Tania Courson
(74) *Attorney, Agent, or Firm* — Pillsbury Winthrop Shaw Pittman LLP

(57) ABSTRACT

A temperature measuring device incorporates a fixed point cell to provide an integrated structure. The fixed point cell houses a pure substance within a substantially cylindrical graphite crucible. The pure substance is to be melted to give an absolute temperature. The crucible is enclosed within a sealed metal container. An annular metal tube surrounds the container and the inner wall of the tube is formed by the outer peripheral wall of the container. This provides excellent heat conduction from the interior of the tube to the interior of the crucible. The tube is arranged to define either a heat pipe or a thermal siphon and includes an appropriate vaporizable fluid.

16 Claims, 3 Drawing Sheets

TEMPERATURE MEASURING DEVICE

CROSS REFERENCE TO RELATED APPLICATIONS

This application claims the benefit of priority to British application no. 0717714.0 filed Sep. 11, 2007, the entire contents of which is incorporated herein in its entirety by reference.

FIELD OF THE INVENTION

The present invention relates to a temperature measuring device incorporating a fixed point cell.

At the highest level of thermal metrology, there exists the International Temperature Scale of 1990 document. In it and an accompanying book called Supplementary Information to ITS-90 is specified a series of absolute temperatures which are used to define the scale. These temperatures are those at which a series of pure substances turn from solid to liquid or vice versa. Supplementary Information to ITS-90 describes how these substances can be embodied into structures, known as fixed point cells, that are useful to thermometrists. When the substance in the fixed point cell is changing state it is at a single unique temperature, its absolute temperature.

At present, fixed point cells are used with apparatus such as cryostats, baths and furnaces. However, current furnaces, for example, are expensive. It may not be possible for a furnace to use the working fluid of choice for safety reasons. There is often poor thermal conductance between the furnace and the fixed point cell such that a series of furnaces are required to enable the required temperature range to be achieved.

SUMMARY OF THE INVENTION

The present invention seeks to provide an improved temperature measuring device incorporating a fixed point cell.

According to the present invention there is provided a temperature measuring device incorporating a fixed point cell, the fixed point cell comprising a pure substance held within a substantially cylindrical crucible, the temperature measuring device further comprising a sealable metal container enclosing the crucible, and an annular metal tube surrounding the container, wherein an inner, substantially cylindrical wall of the metal tube is formed by the outer peripheral wall of the container, and wherein the tube holds a vaporizable fluid and is arranged to provide an isothermal environment around the crucible when heated.

In embodiments of the invention, as the inner wall of the metal tube is formed by the outer peripheral wall of the container, there is excellent heat conduction between the vaporizable fluid in the tube and the substance within the crucible. This enables ideal conditioning of the fixed point cell to be achieved during its change of state.

In an embodiment, the fluid is held within the metal tube under vacuum and the tube is sealed, for example, by welding.

This construction enables the use of working fluids such as caesium, potassium, sodium and the like which are not appropriate for use with conventional furnaces on safety grounds.

The metal tube holding the vaporizable fluid is arranged to provide the isothermal environment in that it provides a thermal siphon or a heat pipe. For a heat pipe, a wick will preferably extend within the metal tube.

In an embodiment, both the crucible and its enclosing container are substantially annular in cross-section whereby a longitudinal bore, which is closed at one end, extends along the central longitudinal axis of the device.

In use, a thermometer or other heat probe may be inserted within the longitudinal bore to monitor a heating or cooling process.

Preferably the crucible is of graphite. Of course, if the graphite crucible is heated to high temperatures it would be converted to carbon dioxide if in the presence of air or oxygen. In an embodiment, the metal container which encloses the crucible is sealed and contains an inert gas, such as argon. The metal container may be sealed by welding a lid thereto.

In a preferred embodiment, the metal container is sealed by a lid through which two elongate tubes extend such that an inert gas can be flowed into and out of the metal container by way of the elongate tubes.

In embodiments, the fixed point cell can attain temperatures in excess of 660° C. At such temperatures, the metal of the metal container may vaporize, and the metallic vapours can contaminate the pure substance within the fixed point cell. It has been found that flowing an inert gas through the metallic container purges any such contaminants.

The pure substance held within the fixed point cell may be one of mercury, water, gallium, indium, tin, zinc, aluminium, silver and copper.

The vaporizable fluid within the metal tube may be one of ammonia, methanol, acetone, water, potassium, sodium, caesium, lithium, hydrogen and oxygen propylene.

The metal of the tube and/or of the container may be one of stainless steel, inconel, aluminium, copper, molybdenum monel, nickel titanium, tungsten, and a Haynes® alloy. Other metal alloys may also be used.

BRIEF DESCRIPTION OF THE DRAWINGS

Embodiments of the present invention will hereinafter be described, by way of example, with reference to the accompanying drawings, in which.

DESCRIPTION OF PREFERRED EMBODIMENTS

Figure 1A:
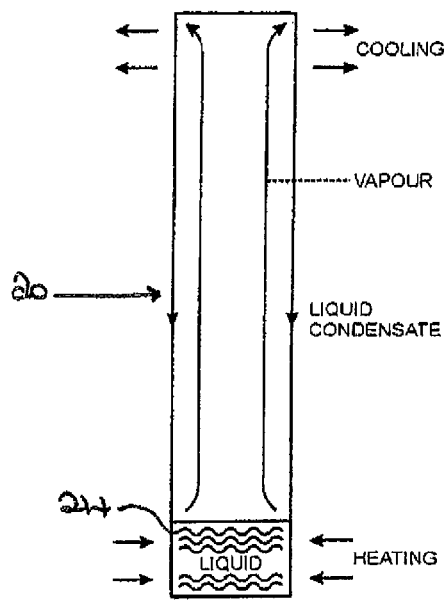
FIG. 1a indicates schematically a thermal siphon and its method of operation.

FIG. 1a shows schematically a thermal siphon and its method of operation. As illustrated, the thermal siphon comprises a metal tube 20 which is sealed and evacuated. A small quantity of liquid 24, for example water, has been placed in the tube before sealing. As illustrated in FIG. 1a, the tube 20 is arranged in an upright condition and its lower end is heated to cause the water to vaporize. As indicated, the vapour moves within the tube to its cooled end where it condenses. The condensate returns to the base of the tube by gravity.

Since the latent heat of evaporation is large, considerable quantities of heat can be transported with a very small temperature difference from end to end. Thus the structure will have a high effective thermal conductance.

The thermal siphon has been used for many years and various working fluids have been employed. However, one limitation of the basic thermal siphon is that, in order for the condensate to be returned to the evaporator region by gravitational force, that evaporator region must be situated at its lowest point.

Figure 1B:
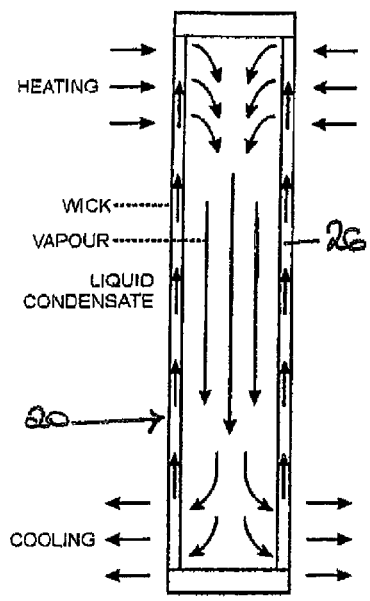
FIG. 1b illustrates schematically a heat pipe and its method of operation.

As can be seen from FIG. 1b, a heat pipe is similar in construction to the thermal siphon but in this case a wick 26, constructed, for example, from a few layers of fine gauze, is fixed to the inside surface of the tube 20 and capillary forces return the condensate to the evaporator. In the heat pipe the evaporator position is not restricted and it may be used in any orientation.

A good thermal siphon or heat pipe has some 200 times the conduction of copper and is therefore ideal for creating isothermal conditions around a fixed point cell.

Presently a thermal siphon or a heat pipe is assembled with a fixed point cell and with apparatus to supply heat. A complex and expensive structure results. Thus, the fixed point cell is placed inside a long container made of inconel which is lowered into the thermal siphon which has been positioned within a furnace. This creates a structure having a number of concentric rings which are alternately of metal and an air gap. The cost of producing and assembling the structure is substantial and the conductance of heat through the structure is poor. Three different furnaces are provided to produce the required temperature range.

Figure 3:
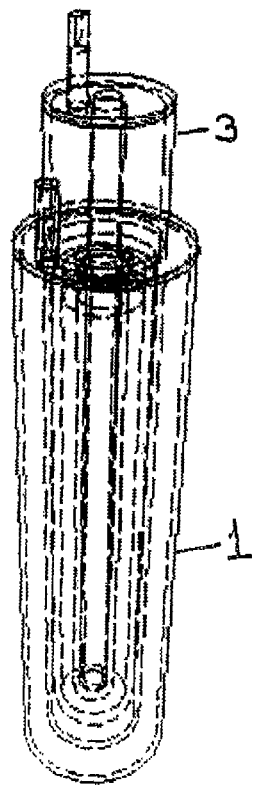
FIG. 3 shows an isometric view of the device of FIG. 2.
Figure 2:
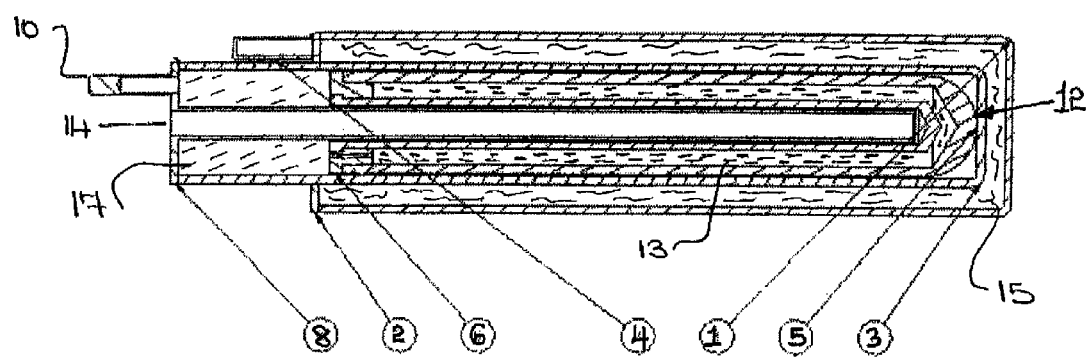
FIG. 2 shows the longitudinal section through a thermal measuring device of the present invention.

FIGS. 2 and 3 show a first embodiment of a temperature measuring device of the present invention. The temperature measuring device incorporates a fixed point cell generally indicated at 12 in FIG. 2. This fixed point cell has a pure substance 13 held within a substantially cylindrical crucible 5. Preferably the crucible 5 is of graphite and has a substantially annular cross-section. The annular graphite crucible 5 is sealed by way of a lid 6 and is enclosed within a sealable metal container generally indicated at 3. In a preferred embodiment, this metal container 3 is made of stainless steel and has a welded lid 8. Preferably, an inert gas 17, such as argon, is filled into metal container 3, by way of filler tube 10, before it is sealed It will be seen that the substantially cylindrical metal container 3 also has substantially annular cross-section whereby the graphite crucible 5 is sealed within the container 3 and a longitudinal bore 14 with a closed end is defined to extend along the central longitudinal axis of the device. A thermometer (not shown) may be received within the longitudinal bore 14.

The outer substantially cylindrical peripheral wall of the container 3 forms the inner wall of a metal tube 1 which also has a substantially annular cross-section. This metal tube 1 is sealed as illustrated by a lid 2 which is preferably welded into position. The metal tube holds a vaporizable fluid 15 which, upon heating, is arranged to provide an isothermal environment around the crucible 5. The metal tube 1 has a filler tube 4 through which the tube may be charged with the fluid.

Because the tube 1 is sealed, reactive fluids can be used as the working fluid within the tube which can be arranged either as a thermal siphon or as a heat pipe as described above.

It will be appreciated from FIGS. 2 and 3 that the fixed point cell 12 and the metal tube 1 providing the heating therefor have been integrated to form a single device. This reduces the number of parts substantially as compared with known apparatus, and hence reduces the cost of construction and assembly. As there are no air gaps, the heat conduction performance of the device is improved. The working fluid within the tube 1 may be selected from ammonia, methanol, acetone, water, potassium, sodium, caesium, lithium, hydrogen and oxygen propylene.

Preferably, the pure substance within the crucible 5 is chosen from mercury, water, gallium, indium, tin, zinc, aluminium, silver and copper.

The substance within the crucible is chosen to provide the temperature required and the working fluid within the tube 1 is chosen to enable that temperature to be attained. Table 1 shows some of the combinations of pure substance and working fluid which might be used.

TABLE 1

| ITS-90 Substance | Approximate Temperature (° C.) | Working Fluid | Range (° C.) |
| --- | --- | --- | --- |
| Mercury | −40 | Ammonia | −60 to +50 |
| Water | 0 | Ammonia | −60 to +50 |
| Gallium | 30 | Ammonia | −60 to +50 |
| Indium | 156 | Water | +20 to +250 |
| Tin | 232 | Water | +20 to +250 |
| Zinc | 420 | Potassium | +400 to +1000 |
| Aluminium | 660 | Potassium | +400 to +1000 |
| Silver | 962 | Sodium | +500 to +1000 |
| Copper | 1085 | Sodium | +500 to +1,100 |

Because the apparatus of the invention is simple and heat efficient, complex and extensive furnaces to supply heat thereto are not required. It has been found that heat can be applied to just a single point of the arrangement. In preferred embodiments the metals of the metal tube and of container are stainless steel. However, the metal of either or both of the tube and container may be stainless steel, inconel, aluminium, copper, molybdenum monel, nickel titanium, tungsten, and a Haynes® alloy.

Figure 4:
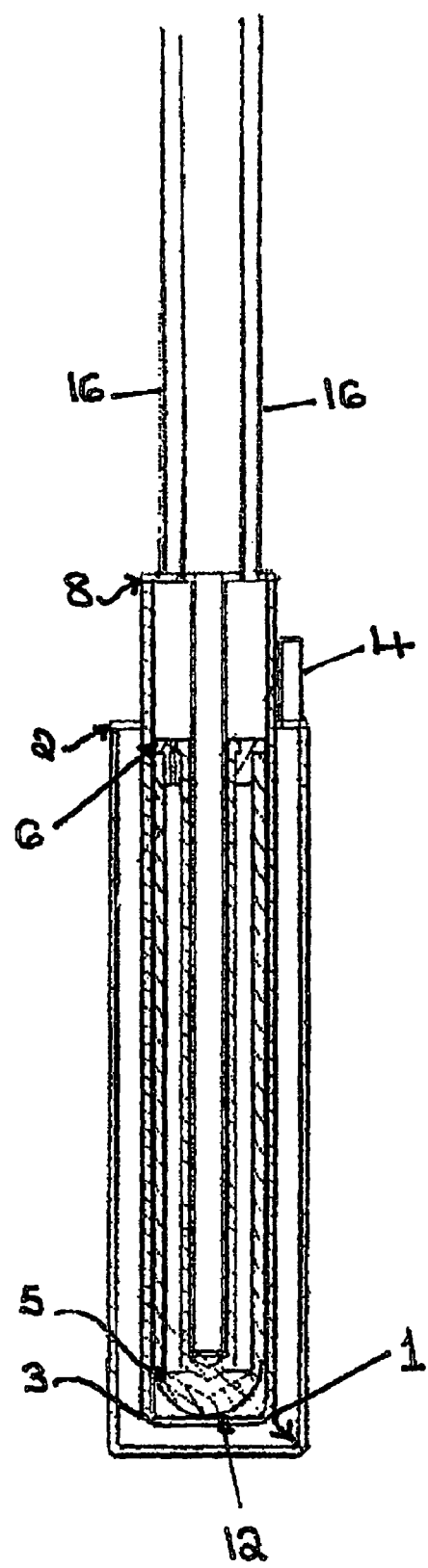
FIG. 4 shows a longitudinal section through a further embodiment of a thermal measuring device of the present invention.

FIG. 4 shows a longitudinal section through a second embodiment of a temperature measuring device. This figure employs the same reference numerals as in FIGS. 2 and 3 to denote the same or similar features.

In the embodiment of FIGS. 2 and 3 an inert gas, such as argon, is provided in metal container 3 to protect the purity of the metal of the container 3 and to prevent oxidisation of the graphite of the crucible 5 at high temperatures. It has been found that the inert gas works well up to temperatures of the order of 660° C. However, at higher temperatures, for example, when the crucible contains silver (962° C.) or copper (1085° C.), the metal of the container 3 becomes so hot that it out-gasses metallic vapours which can contaminate the silver or copper.

In the arrangement shown in FIG. 4, two elongate tubes 16 are attached to and penetrate the lid sealing the metal container 3 to enable gas to be circulated into and out of the metal container 3. Then, a purge of an inert gas, for example, of argon or nitrogen is flowed through the metal container 3. For example, the gas flow can be controlled by an appropriate control valve and flow meter (not illustrated) to flow at, say, 0.1 to 0.2 liters per minute through the metal container 3. The inert gas protects the metal and graphite, as previously, but the slow flow through the metal container flushes away any contaminants vapourised from the metal of the container 3.

It will be appreciated that improvements to, and variations of, the embodiments as described and illustrated may be made within the scope of the invention as defined in the appended claims.

The invention claimed is:

1. A temperature measuring device incorporating a fixed point cell, the fixed point cell comprising a substantially cylindrical crucible with a pure substance held within the crucible, and a sealable metal container enclosing the crucible, and the temperature measuring device further comprising an annular metal tube surrounding the metal container of the fixed point cell, wherein the metal tube holds a vaporizable fluid which, upon heating, provides an isothermal environment around the fixed point cell, and wherein the metal tube has an inner, substantially cylindrical wall which is formed by an outer peripheral wall of the metal container of the fixed point cell whereby the fixed point cell and the metal tube providing the heating therefor are integrated to form a single device.

2. A temperature measuring device according to claim 1, wherein the fluid is held within the tube under vacuum and the tube is sealed.

3. A temperature measuring device according to claim 2, wherein the metal tube is sealed by welding.

4. A temperature measuring device according to claim 3, wherein both the crucible and its enclosing container are substantially annular in cross-section whereby a longitudinal bore, which is closed at one end, extends along the central longitudinal axis of the device.

5. A temperature measuring device according to claim 1, wherein the metal tube defines a thermal siphon.

6. A temperature measuring device according to claim 1, further comprising a wick which extends within the metal tube which thereby defines a heat pipe.

7. A temperature measuring device according to claim 1, wherein both the crucible and its enclosing container are substantially annular in cross-section whereby a longitudinal bore, which is closed at one end, extends along the central longitudinal axis of the device.

8. A temperature measuring device according to claim 1, wherein said metal container is sealed by welding.

9. A temperature measuring device according to claim 1, wherein said metal container contains an inert gas.

10. A temperature measuring device according to claim 9, wherein said inert gas is argon.

11. A temperature measuring device according to claim 1, wherein the metal container is sealed by a lid through which two elongate tubes extend such that an inert gas can be flowed into and out of the metal container by way of the elongate tubes.

12. A temperature measuring device according to claim 11, wherein said inert gas is argon.

13. A temperature measuring device according to claim 1, wherein the pure substance held within the fixed point cell is one of the group consisting of: mercury, water, gallium, indium, tin, zinc, aluminium, silver and copper.

14. A temperature measuring device according to claim 1, wherein the vaporizable fluid within the metal tube is one of the group consisting of: ammonia, methanol, acetone, water, potassium, sodium, caesium, lithium, hydrogen and oxygen propylene.

15. A temperature measuring device according to claim 1, wherein the metal of the tube and of the container is one of the group consisting of: stainless steel, inconel, aluminium, copper, molybdenum morsel, nickel titanium, tungsten, and a Haynes® alloy.

16. A temperature measuring device according to claim 1, wherein the crucible is of graphite.

* * * * *